United States Patent Office 2,956,013
Patented Oct. 11, 1960

2,956,013

PROCESS FOR THE PURIFICATION OF HYDROCARBONS USED AS AUXILIARY LIQUIDS IN THE POLYMERIZATION OF ETHYLENE

Nikolaus Geiser, Oberhausen-Holten, Helmut Kolling, Duisburg-Hamborn, and Ewald Stiebling, Oberhausen-Sterkrade, Germany, assignors to Ruhrchemie Aktiengesellschaft, Oberhausen-Holten, Germany No Drawing. Filed Nov. 4, 1957, Ser. No. 694,069

4 Claims. (Cl. 208—212)

The polymerization of ethylene at pressures below about 100 kg./sq. cm. and temperatures up to about 100° C. is known. This process is effected with the use of catalysts which consist of mixtures of organometallic compounds, especially aluminum alkyl compounds, with compounds of metals of the 4th to 6th subgroups of the periodic table, the preferred metal compounds being titanium compounds, as for example, titanium tetrachloride (see Belgian Patents Nos. 532,362 and 534,792 and "Angewandte Chemie," 67, 541–547 (1955)). In this synthesis, use is generally made of an auxiliary liquid in which the polyethylene produced is suspended. In most cases, hydrocarbon fractions of the gasoline or diesel oil boiling range are used as the auxiliary liquids. Purely aliphatic hydrocarbon mixtures from the hydrogenation of carbon monoxide by Fischer-Tropsch are particularly suited. However, they must be carefully freed from moisture and oxygen-containing compounds since otherwise the course of the polymerization is disturbed. Hydrocarbon fractions derived from petroleum generally consist of mixtures of aliphatics, naphthenes and aromatics. They are not directly suited as auxiliary liquids, particularly due to the impurities contained therein as, for example, sulfur-containing compounds. It has already been suggested to purify the aliphatic hydrocarbon fractions derived from the Fischer-Tropsch carbon monoxide hydrogenation by first passing said fractions, at temperatures of 230–280° C. and together with hydrogen, over a hydrogenation catalyst, subsequently refining them with concentrated sulfuric acid, neutralizing them by washing, and drying them. Another proposal involves hydrogenation, subsequent refining and drying, mixing with small amounts of the catalyst used for the polymerization while carefully excluding moisture, and separation of the fractions from the resulting precipitate; it is sometimes possible to omit the sulfuric acid refining step.

According to other suggestions petroleum-derived distillates of the gasoline or diesel oil boiling range were first refined in the vapor state at temperatures between about 400° and 600° C. over catalysts containing $Al_2O_3$ and/or $SiO_2$ and subsequently passed in contact with a hydrogenation catalyst containing metallic nickel or cobalt at temperatures of between about 150 and 200° C. Here again, this purification could still be improved, according to another proposal, by mixing the distillates prior to charging them to the polymerization reactor, with small amounts of the catalyst used for the polymerization of ethylene, while carefully excluding moisture and separating the distillates from the precipitate formed.

It is true that the treatment of the hydrocarbon auxiliary liquid, i.e. of both the purely aliphatic fractions and the petroleum-derived fractions, with polymerization catalyst results in a considerable increase in polyethylene yield in the subsequent polymerization, calculated on catalyst added during the polymerization. However, the disadvantage of this mode of operation consists in that a change in the concentrations of titanium tetrachloride and aluminum alkyl, i.e. the concentrations of the catalyst components in the reaction mixture must be put up with; this is particularly true in case the polymerization is carried out continuously over an extended period of time. This change in concentration frequently exerts an unfavorable influence giving rise, for example, to the formation of troublesome films in the reaction vessel. Moreover, the production of polyethylene having a constant molecular weight over an extended period of time becomes difficult or even impossible.

It is an object of the invention to provide a process which overcomes the above mentioned difficulties.

It has been found that the preparation of hydrocarbon mixtures suited as auxiliary liquids for the polymerization of ethylene effected at pressures below about 100 kg./sq. cm. and at temperatures up to about 100° C. and with the use of catalysts consisting of mixtures of organometallic compounds, particularly aluminum alkyl compounds, with compounds of metals of the 4th to 6th subgroups of the periodic table and particularly with titanium tetrachloride, leads to very favorable polymerization results if distillates of the gasoline or diesel oil boiling range are passed at temperatures between about 150 and 300° C. together with hydrogen or hydrogen-containing gases, in contact with a hydrogenation catalyst containing metallic nickel or cobalt, then dried and treated with titanium trichloride with careful exclusion of moisture, and finally separated from the precipitate formed.

Although in continuous operations over extended periods of time a certain change in the titanium tri-chloride concentration in the reaction mixture will likewise occur in this case, since small parts of the titanium trichloride are soluble in the hydrocarbon auxiliary liquid, this change does not entail disadvantageous effects. Sometimes, it may even be of advantage since an enrichment of aluminum alkyl compounds in the reaction mixture is frequently observed in continuous polymerization. By introducing titanium trichloride with the pretreated auxiliary liquid, this enrichment can be compensated to a more or less great extent without any troublesome effects as they sometimes occur when titanium tetrachloride is used. Petroleum-derived distillates of the gasoline or diesel-oil boiling range, prior to being hydrogenated, are preferably refined in vaporous state at temperatures between about 400° and 600° C. over catalysts containing $Al_2O_3$ and/or $SiO_2$.

For mixtures of aliphatic hydrocarbons of the gasoline or diesel oil boiling range obtained from the Fischer-Tropsch carbon monoxide hydrogenation, a hydrogenation at temperatures between 230 and 280° C. has proven particularly satisfactory.

The titanium trichloride used for the treatment may be prepared in a manner known per se by mixing titanium tetrachloride and aluminum alkyl compounds and subsequently washing the precipitate thereby formed with thoroughly purified and dried hydrocarbon auxiliary liquid. Another possibility of preparing the titanium trichloride used for the treatment is to reduce titanium tetrachloride with hydrogen. The titanium trichloride is preferably used while suspended in the purified hydrocarbon auxiliary liquid.

The treatment of the distillates is preferably effected by stirring the same with small portions of titanium trichloride e.g. at temperatures up to 100° C. and subsequently separating them from the precipitate by filtration or settling.

The process according to the invention will now be more fully explained in a number of examples, but it should be understood that these are given by way of illustration and not of limitation and that many changes in

Example 1

A distillate boiling between 80° and 180° C. and obtained from Arabian crude oil containing 0.07% by weight of sulfur, was passed in contact with a catalyst consisting of $Al_2O_3$ at 520° C. using a flow rate of 1 part by volume of liquid distillate per part by volume of catalyst per hour. The sulfur content of the refined product was 0.006% by weight. The refined product was subsequently passed at a pressure of 20 kg./sq. cm. in upward direction through a vertical tube of 6 meters in length and 50 mm. inside diameter filled with pieces of a nickel catalyst consisting of 100 parts by weight of nickel, 15 parts by weight of magnesia and 100 parts by weight of kieselguhr. The reaction temperature was 220° C. and the retention time in the reaction chamber was about 2 hours.

The product thus treated was then passed through a vertical tube of 4 meters in length and 150 mm. inside diameter filled with fine-grained calcined calcium chloride. The retention time was about 1.5 hours. The finished product had a sulfur content of 0.007% by weight and a content of aromatics of below 1%. The analytical characteristics such as neutralization number, saponification number, hydroxyl number and iodine number were zero.

10 liters of the hydrocarbon auxiliary liquid pretreated in this manner were stirred for 30 minutes with 3 grams of titanium trichloride at a temperature of 20° C. and separated from the precipitate after a settling period of 24 hours.

2 liters of this purified auxiliary liquid were used for a polymerization run. For this purpose, 2 liters of the hydrocarbon auxiliary liquid were filled into a container with agitator of 5 liters capacity which had previously been thoroughly rinsed with highly purified ethylene gas. After heating of the auxiliary liquid to about 50° C., the catalyst solution was added while constantly agitating and passing ethylene therethrough. The catalyst solution had been prepared by mixing 70 cc. of the same auxiliary liquid, 0.64 gm. of diethyl aluminum monochloride, and 0.86 gm. of titanium tetrachloride and vigorously agitating the mixture for 30 minutes. Upon the addition of the catalyst solution, the temperature increased to about 70° C. After the first hour of reaction, 3 cc. of air freed from moisture and other undesirable impurities were introduced hourly into the incoming gas stream.

For comparison, a second polymerization was carried out in the same manner but using a hydrocarbon liquid which had not been purified by treatment with titanium trichloride. The following yields of polyethylene, calculated on catalyst charged to the polymerization, were obtained in the two experiments:

| | Grams of polyethylene per gram of catalyst |
|---|---|
| Hydrocarbon auxiliary liquid with no $TiCl_3$ treatment | 325 |
| With $TiCl_3$ treatment | 615 |

This corresponds to an increase in yield by nearly 90% for the case in which the hydrocarbon auxiliary liquid had been pretreated with titanium trichloride.

Example 2

A hydrocarbon fraction obtained by the hydrogenation of carbon monoxide and boiling between 90° and 180° C. was passed in upward direction through a vertical pressure tube of 6 meters in length and 50 mm. inside diameter filled with a solid nickel catalyst consisting of 100 parts by weight of nickel, 50 parts by weight of kieselguhr and 10 parts by weight of MgO. The pressure tube was heated by an oil jacket with the temperature being adjusted to 250° C. Throughput of hydrocarbon mixture was 5 liters/hr. and the hydrogen partial pressure was 30 kg./sq. cm.

The hydrocarbon mixture leaving the pressure tube was depressurized and cooled to 20° C. It was subsequently passed through a vertical tube of 4 meters in length and 150 mm. diameter filled with fine-grained calcium chloride. 10 liters of the hydrocarbon auxiliary liquid pretreated in this manner were stirred for 30 minutes with 3 grams of titanium trichloride at a temperature of 20° C. and separated from the precipitate after a settling period of 24 hours.

A polymerization run was now effected with 2 liters of this purified auxiliary liquid. For this purpose, 2 liters of the hydrocarbon auxiliary liquid were filled into a container with stirrer of 5 liters capacity, which had previously been thoroughly rinsed with highly purified ethylene gas. After heating of the auxiliary liquid to about 50° C., the catalyst solution was added while constantly stirring and passing ethylene therethrough. The catalyst solution had been prepared by mixing 50 cc. of the same auxiliary liquid, 0.44 gram of diethyl aluminum monochloride, and 0.56 gram of titanium tetrachloride and vigorously stirring the mixture for 30 minutes. Upon addition of the catalyst solution, the temperature increased to about 70° C. After the first hour of reaction, 3 cc. of air freed from moisture and other undesirable impurities were introduced into the incoming gas stream.

For comparison, a second polymerization run was effected in the same manner but using a hydrocarbon auxiliary liquid, the purification of which had been effected only by hydrogenation and drying, while omitting the pretreatment with titanium trichloride. The following yields of polyethylene, calculated on catalyst charged to the polymerization, were obtained in the two experiments:

| | Grams of polyethylene per gram of catalyst |
|---|---|
| Hydrocarbon auxiliary liquid with no $TiCl_3$ treatment | 345 |
| With $TiCl_3$ treatment | 710 |

This corresponds to an increase in yield by 106% for the case in which the hydrocarbon auxiliary liquid had been pretreated with titanium trichloride.

What we claim is:

1. In a process for the production of hydrocarbon mixtures useful as auxiliary liquids in the polymerization of ethylene effected at pressures below about 100 kg./sq. cm. and temperatures up to about 100° C. with the use of catalysts consisting of mixtures of organometallic compounds with compounds of metals of the 4th to 6th subgroups of the periodic table, the steps which comprise passing a hydrocarbon distillate fraction selected from the class consisting of distillates boiling in the gasoline and diesel oil boiling ranges together with a hydrogen-containing gas over a hydrogenation catalyst at a temperature in the range of about 150° to 300° C., drying the resulting product, then contacting said product with titanium trichloride while thoroughly excluding moisture, and separating the resulting precipitate therefrom.

2. A process in accordance with claim 1, wherein said hydrocarbon distillate fraction is derived from petroleum and, prior to said hydrogenation step, is subjected to a catalytic refining treatment including passage in the vapor state over a catalyst selected from the group consisting of $Al_2O_3$, $SiO_2$ and mixtures thereof at a temperature in the range of about 400° to 600° C.

3. A process in accordance with claim 1, wherein said hydrocarbon distillate fraction is obtained from the Fischer-Tropsch hydrogenation of carbon monoxide and said hydrogenation is carried out at a temperature in the range of about 230° to 280° C.

4. A process in accordance with claim 1, wherein the titanium trichloride contact is carried out with stirring at temperatures up to 100° C.

References Cited in the file of this patent

UNITED STATES PATENTS

| | | |
|---|---|---|
| 2,758,060 | Porter | Aug. 7, 1956 |
| 2,773,110 | Liiben | Dec. 4, 1956 |
| 2,796,387 | Schmidt | June 18, 1957 |

FOREIGN PATENTS

| | | |
|---|---|---|
| 538,782 | Belgium | Dec. 6, 1955 |